(12) United States Patent
Duckwall (10) Patent No.: US 6,839,791 B2
(45) Date of Patent: *Jan. 4, 2005

(54) METHOD AND APPARATUS FOR ACCELERATING DETECTION OF SERIAL BUS DEVICE SPEED SIGNALS

(75) Inventor: William S. Duckwall, Santa Cruz, CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/214,285

(22) Filed: Aug. 5, 2002

(65) Prior Publication Data

US 2002/0188780 A1 Dec. 12, 2002

Related U.S. Application Data

(63) Continuation of application No. 09/441,390, filed on Nov. 16, 1999, now Pat. No. 6,457,086.

(51) Int. Cl.[7] .............................. G06F 13/42; G06F 3/00
(52) U.S. Cl. ........................... 710/305; 710/16; 710/11; 710/105
(58) Field of Search ............................... 710/8–19, 100, 710/300–304, 104–106, 305

(56) References Cited

U.S. PATENT DOCUMENTS

| | | | |
|---|---|---|---|
| 4,156,798 A | 5/1979 | Doelz | 179/15 AL |
| 4,194,113 A | 3/1980 | Fulks et al. | 371/20 |
| 5,014,262 A | 5/1991 | Harshavardhar | 370/16 |
| 5,274,631 A | 12/1993 | Bhardwaj | 370/60 |
| 5,343,461 A | 8/1994 | Barton et al. | 370/13 |
| 5,394,556 A | 2/1995 | Oprescu | 395/800 |
| 5,452,330 A | 9/1995 | Goldstein | 375/257 |

(List continued on next page.)

OTHER PUBLICATIONS

IEEE Standard for a High Performance Serial Bus, Std 1394–1995, 1996, pp. i, ii, 226, 227.*

"IEEE Standard for a High Performance Serial Bus", IEEE Standard 1394–1995, Institute of Electrical and Electronics Engineers, Inc., Aug. 30, 1996.

"IEEE Standard for a High Performance Serial Bus–Amendment 1", Institute of Electrical and Electronics Engineers, Inc., pp. 1–196, 2000 (no month).

P1394b IEEE Draft Standard for a High Performance Serial Bus (High Speed Supplement), Institute of Electrical and Electronics Engineers, Inc., pp. 1–408, 2002 (no month).

"AV/C Digital Interface Command Set General Specification, Rev. 3.0", 1394 Trade Association, pp. 4–5, 20–34, Apr. 15, 1998.

"Enhancements to the AV/C General Specification 3.0 Version 1.OFC1", 1394 Trade Association, pp. 4, 6–17, Nov. 5, 1998.

"Fibre Channel–Methodologies for Jitter Specification", NCITS TR-25–1999, Jitter Working Group Technical Report, Rev. 10, pp. 1–96, Jun. 9, 1999.

Primary Examiner—Sumati Lefkowitz
(74) Attorney, Agent, or Firm—Sierra Patent Group, Ltd.

(57) ABSTRACT

A method and apparatus for accelerating detection of speed code signals, and in particular S400 signals, for IEEE Standard 1394-1995 serial bus devices. The present invention validates S400 mode immediately after detecting an S400 speed signal, or immediately after detecting an S400 speed signal following a first to S200 speed signal. The invention further provides S200 and S100 mode validation according to current implementations. Additionally, the invention does not require RX_DATA_PREFIX as a prerequisite for signal detection.

6 Claims, 6 Drawing Sheets

U.S. PATENT DOCUMENTS

| | | | | |
|---|---|---|---|---|
| 5,490,253 A | | 2/1996 | Laha et al. | 395/304 |
| 5,495,481 A | | 2/1996 | Duckwall | 370/85.2 |
| 5,539,390 A | | 7/1996 | Nagano et al. | 340/825.07 |
| 5,541,670 A | | 7/1996 | Hanai | 348/705 |
| 5,568,641 A | | 10/1996 | Nelson et al. | 395/700 |
| 5,583,922 A | | 12/1996 | Davis et al. | 379/93.09 |
| 5,621,659 A | | 4/1997 | Matsumoto et al. | 364/514 R |
| 5,630,173 A | | 5/1997 | Oprescu | 395/860 |
| 5,632,016 A | * | 5/1997 | Hoch et al. | 710/30 |
| 5,640,595 A | | 6/1997 | Baugher et al. | 395/830 |
| 5,684,715 A | | 11/1997 | Palmer | 365/514 |
| 5,701,476 A | | 12/1997 | Fenger | 395/652 |
| 5,701,492 A | | 12/1997 | Wadsworth et al. | 395/712 |
| 5,712,834 A | | 1/1998 | Nagano et al. | 369/19 |
| 5,719,862 A | | 2/1998 | Lee et al. | 370/355 |
| 5,764,930 A | * | 6/1998 | Staats | 710/107 |
| 5,784,648 A | | 7/1998 | Duckwall | 395/860 |
| 5,802,048 A | | 9/1998 | Duckwall | 370/389 |
| 5,802,057 A | | 9/1998 | Duckwall et al. | 370/408 |
| 5,805,073 A | | 9/1998 | Nagano et al. | 340/825.07 |
| 5,809,331 A | | 9/1998 | Staats et al. | 395/830 |
| 5,832,298 A | | 11/1998 | Sanchez et al. | 395/828 |
| 5,835,761 A | | 11/1998 | Ishii et al. | 395/653 |
| 5,867,730 A | | 2/1999 | Leyda | 395/830 |
| 5,875,301 A | | 2/1999 | Duckwall et al. | 395/200.51 |
| 5,938,764 A | | 8/1999 | Klein | 713/1 |
| 5,968,152 A | | 10/1999 | Staats | 710/104 |
| 5,970,052 A | | 10/1999 | Lo et al. | 370/241 |
| 5,987,605 A | | 11/1999 | Hill et al. | 713/2 |
| 6,032,202 A | | 2/2000 | Lea et al. | 710/8 |
| 6,038,625 A | | 3/2000 | Ogino et al. | 710/104 |
| 6,070,187 A | | 5/2000 | Subramaniam et al. | 709/220 |
| 6,073,206 A | | 6/2000 | Piwonka et al. | 711/102 |
| 6,122,248 A | | 9/2000 | Murakoshi et al. | 370/216 |
| 6,131,129 A | | 10/2000 | Ludtke | 710/5 |
| 6,131,134 A | * | 10/2000 | Huang et al. | 710/302 |
| 6,133,938 A | | 10/2000 | James | 348/8 |
| 6,138,196 A | | 10/2000 | Takayama et al. | 710/105 |
| 6,141,702 A | | 10/2000 | Ludtke et al. | 710/5 |
| 6,141,767 A | | 10/2000 | Hu et al. | 714/1 |
| 6,157,972 A | | 12/2000 | Newman et al. | 710/100 |
| 6,160,796 A | | 12/2000 | Zou | 370/257 |
| 6,167,532 A | | 12/2000 | Wisecup | 713/300 |
| 6,173,327 B1 | | 1/2001 | De Borst et al. | 709/231 |
| 6,192,189 B1 | | 2/2001 | Fujinami et al. | 386/96 |
| 6,202,210 B1 | | 3/2001 | Ludtke | 725/20 |
| 6,233,615 B1 | | 5/2001 | Van Loo | 709/224 |
| 6,233,624 B1 | | 5/2001 | Hyder et al. | 709/327 |
| 6,247,083 B1 | | 6/2001 | Hake et al. | 710/107 |
| 6,253,114 B1 | | 6/2001 | Takihara | 700/83 |
| 6,253,255 B1 | | 6/2001 | Hyder et al. | 709/321 |
| 6,260,063 B1 | | 7/2001 | Ludtke et al. | 709/224 |
| 6,266,334 B1 | | 7/2001 | Duckwall | 370/397 |
| 6,266,344 B1 | * | 7/2001 | Fujimori et al. | 370/468 |
| 6,266,701 B1 | | 7/2001 | Sridhar et al. | 709/232 |
| 6,282,597 B1 | | 8/2001 | Kawamura | 710/105 |
| 6,295,479 B1 | | 9/2001 | Shima et al. | 700/83 |
| 6,308,222 B1 | | 10/2001 | Krueger et al. | 709/247 |
| 6,311,228 B1 | | 10/2001 | Ray | 709/301 |
| 6,345,315 B1 | | 2/2002 | Mishra | 709/329 |
| 6,353,868 B1 | | 3/2002 | Takayama et al. | 710/129 |
| 6,363,085 B1 | * | 3/2002 | Samuels | 370/502 |
| 6,385,679 B1 | | 5/2002 | Duckwall et al. | 710/119 |
| 6,457,086 B1 | * | 9/2002 | Duckwall | 710/305 |

\* cited by examiner

METHOD AND APPARATUS FOR ACCELERATING DETECTION OF SERIAL BUS DEVICE SPEED SIGNALS

CROSS-REFERENCE TO RELATED APPLICATIONS

This application is a continuation of application Ser. No. 09/441,390, filed on Nov. 16, 1999 now U.S. Pat. No. 6,457,086.

BACKGROUND OF THE INVENTION

1. Field of the Invention

This invention pertains generally to speed signal detection in serial bus device communication. More particularly, the invention is a method and apparatus for accelerating detection of speed code signals, and in particular S400 signals in IEEE Standard 1394-1995, to thereby reduce the bottleneck through physical layer services of a serial bus device.

2. The Prior Art

The Institute of Electrical and Electronics Engineers, Inc. (IEEE) defines the IEEE Standard 01394-1995 serial bus architecture in the document "IEEE Standard for a High Performance Serial Bus" published Aug. 30, 1996 which is incorporated herein by reference. In IEEE 1394, the serial bus architecture is defined in terns of nodes. In general, a node is an addressable entity (i.e., a logical entity with a unique address), which can be independently reset and identified.

The IEEE Standard 1394-1995 further describes a set of three stacked layers comprising a transaction layer, a link layer (LINK), and a physical layer (PHY). Interoperability between the serial bus nodes begins with the physical connection, typically through cables, connectors, and PHY silicon.

The PHY has three primary functions: transmission and receptions of data bits, arbitration, and provision for the electrical and mechanical interface. Transmission of data bits is carried out using the transmission format 1 depicted in FIG. 1. The transmission format 1 includes a data prefix 2 and a data packet 3.

Figure 1:
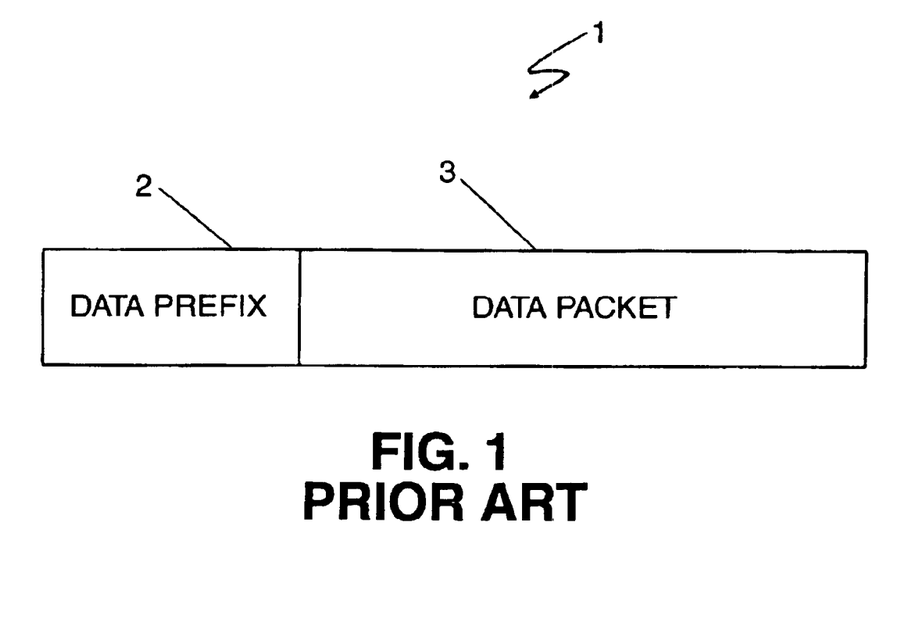
FIG. 1 is a block diagram showing generally a data transmission format used in conjunction with serial bus data transmission and according to the present invention.

For every data packet 3 that is transmitted, the data packet 3 is preceded by a data prefix 2. The data packet 3 may vary in size according to the data transmitted. For example, the data packet may be 8 kilobits (Kb) at S100 speeds (or 32 Kb at S400 speeds).

The data prefix 2 communicates, among other things, a speed code signal to indicate the data rate of transmission. The cable environment supports multiple data rates of 98.304 megabits per second (Mb/s) or S100, 196.608 Mb/s or S200, and 393.216 Mb/s or S400. The lowest speed (S100) is known as the "base rate". If a higher rate is supported then all lower rates also required.

Speed signaling (also known as common mode signaling) is carried out by indicating an analog signal, and in particular, a common voltage drop ($V_{cm}$) across the Twisted Pair B (TPB) interface of the cable media as is known in the art. As noted above, this speed code signal is communicated during the data prefix 2 portion of the data transmission 1. In general, the speed code signal communicated during the data prefix 2 must be completed 40 nanoseconds (ns) before the data packet 3 portion.

Figure 2A:
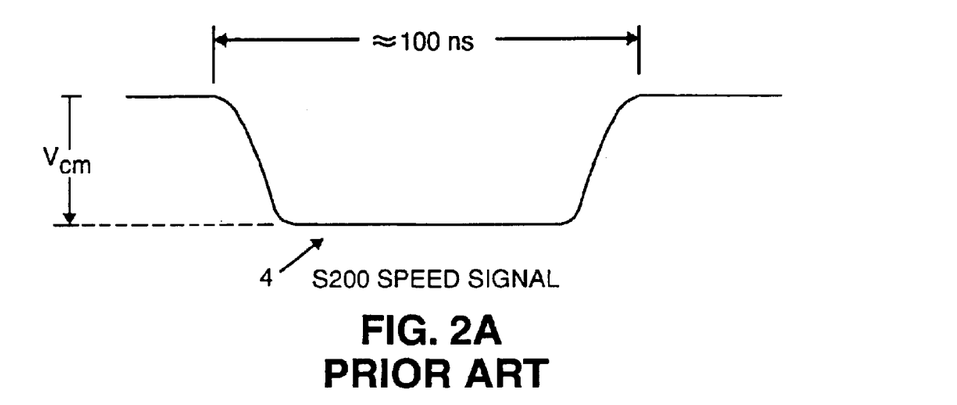
FIG. 2a shows generally an S200 speed code signal.
Figure 2B:
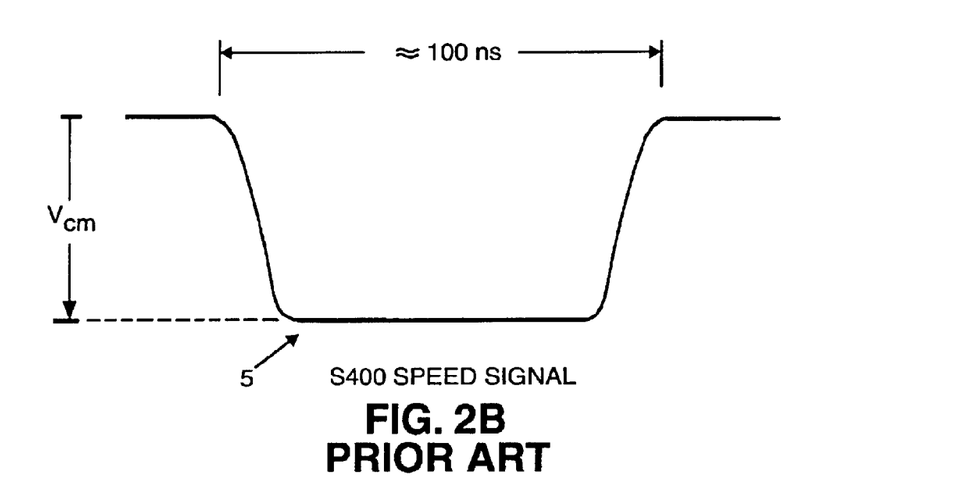
FIG. 2b shows generally an S400 speed code signal.

FIG. 2a and FIG. 2b illustrate generally speed code signals communicated by the PHY devices as described above. FIG. 2a illustrates an S200 speed code signal 4 to indicate the S200 data rate. FIG. 2b illustrates an S400 speed code signal 5 to indicate the S400 data rate. The base rate (S100) is indicated by a lack or absence of a speed signal code signal during the data prefix 2.

The S200 speed code signal 4 and the S400 speed code signal 5 are generally 100 ns in length. However, the S200 speed code signal 4 indicates a $V_{cm}$ drop of about 140 millivolts (mV). In contrast, the S400 speed code signal 5 indicates a $V_{cm}$ drop of about 450 mV. The details of implementing speed signal reception was largely left to the designer of a PHY to provide the necessary filtering algorithm that ascertains the various speed code signals communicated by the other PHY devices on the serial bus.

Figure 3:
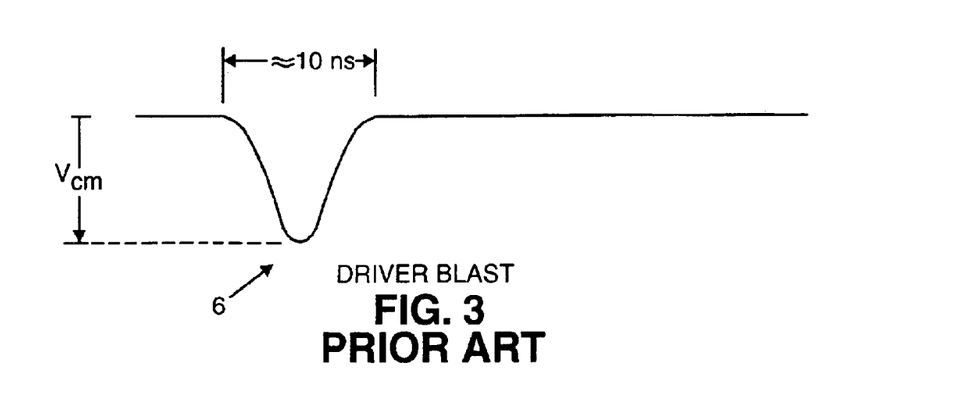
FIG. 3 shows generally a driver blast signal.

Referring now to FIG. 3 there is generally shown a "driver blast" signal 6 which may sometimes be indicated during the data prefix portion 2 of the data transmission 1. This driver blast signal 6 may sometimes arise when the output of differential port drivers are not activated simultaneously, thereby creating a $V_{cm}$ drop of about 140 mV generally lasting no more than 10 ns.

The problem created by the driver blast signal 6 is that the $V_{cm}$ drop of the driver blast signal 6 appears like and has a similar slope and amplitude to the $V_{cm}$ drop of an S200 speed code signal 4. The difference between the two signals is the length of the signal, the S200 speed code signal 4 lasting about 100 ns while the driver blast signal 6 generally lasting no longer than 10 ns. To distinguish between the driver blast signal 6 and the speed code signals 4, 5, and to avoid misinterpreting the driver blast signal 6 for a speed code signal, a proposed speed filter algorithm has been provided in Table 8–21 of the P1394a Draft 4.0 (most recent), published by the IEEE in Sep. 15, 1999 and is incorporated herein by reference. Many current PHY devices implement this speed filter algorithm.

Figure 4:
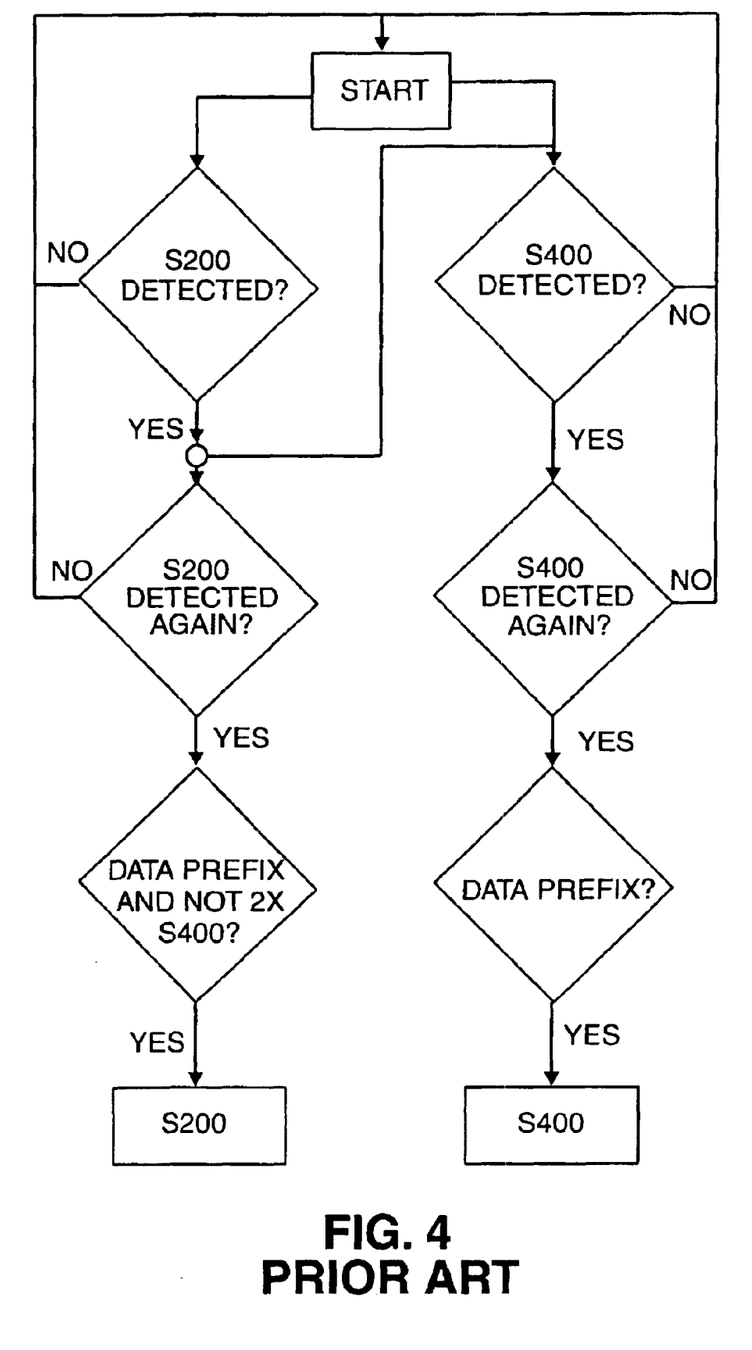
FIG. 4 shows generally a flow chart according to the prior art algorithm for speed signal detection.

This proposed speed filter algorithm is represented in flow chart form in FIG. 4. In general, signals are sampled at 20 ns intervals. According to the algorithm, if two consecutive S200 signals (i.e., $V_{cm}$ drop level to that of an S200 speed code signal) are observed then S200 mode is determined to be valid. Similarly, if two consecutive S400 signals are observed, then S400 mode is determined to be valid. Otherwise S100 mode is the default mode. By requiring two consecutive signals, both of S200 or both of S400, the driver blast signal 6 can be filtered out because two consecutive samples requires the necessary Vcm signal for a 20 ns period minimum, whereas the Vcm produced by the driver blast signal 6 generally lasts no more than 10 ns.

As shown in FIG. 4, it is common to first detect the S200 signal 4 before detecting the S400 signal 5, primarily due to the slope of the S400 signal. This is because the leading edge of an S400 speed signal is a somewhat leisurely drop to S400 levels; it spends considerable time transitioning through S200 range. In general, the total propagation delay (bottleneck) of a signal through a PHY device is generally 130 to 140 ns, a portion of which is dedicated to sampling speed codes. For detection of S400 speed signals for example, the prior art algorithm described above may not determine the validity of an S400 speed signal until as late as 60 ns (20 ns for sampling the S200 signal, plus 40 ns for sampling two consecutive S400 signals). It is noted that for detection of S200 speed signals, the prior art algorithm described above consumes about 40 ns (two consecutive samples at 20 ns each) for sampling signal. Thus, the propagation delay for detecting S400 signals will generally be greater than the propagation delay for detecting S200 signal.

It is observed that the $V_{cm}$ drop level produced by the driver blast 6 does not reach the $V_{cm}$ drop level produced by an S400 speed code signal 5. Thus, for S400 speed code signaling, filtering for driver blast 6 is not generally required. The prior art algorithm which samples and filters for two consecutive S400 signals thus increases the propagation delay through a PHY device, increasing the overall propagation delay of an S400 transmission on the serial bus as noted above.

Additionally, according to the prior art algorithm, the port must already be receiving RX_DATA_PREFIX. Thus portRspeed cannot go valid (a speed mode cannot be validated) until one clock after portR—typically a 20 ns delay.

Accordingly, there is a need for a method and apparatus for accelerating detection of speed code signals to thereby reduce the bottleneck through a PHY device due to speed signal sampling. The present invention satisfies these needs, as well as others, and generally overcomes the deficiencies found in the background art.

An object of the invention is to provide a method and apparatus for accelerating detection of speed code signals which overcomes the deficiencies of the prior art.

Another object of the invention is to provide a method and apparatus for accelerating detection of speed code signals which reduces the propagation through a PHY device.

Another object of the invention is to provide a method and apparatus for accelerating detection of S400 speed code signals.

Further objects and advantages of the invention will be brought out in the following portions of the specification, wherein the detailed description is for the purpose of fully disclosing the preferred embodiment of the invention without placing limitations thereon.

BRIEF DESCRIPTION OF THE INVENTION

The present invention is a method and apparatus embodied in physical layer services suitable for use with serial bus devices, such as IEEE standard 1394-1995 serial bus devices. The invention further relates to machine readable media on which are stored embodiments of the present invention. It is contemplated that any media suitable for retrieving instructions is within the scope of the present invention. By way of example, such media may take the form of magnetic, optical, or semiconductor media. More particularly, a first embodiment of the present invention comprises speed code algorithm code in the form of HDL (Hardware Description Language) code. Another embodiment of the present invention comprises silicon devices (e.g., state machine logic) carrying out the functions described herein with respect to the speed code algorithm.

In its most general terms, the algorithm of the present invention comprises validating S400 mode immediately after detecting an S400 speed signal level, or after detecting an S400 speed signal level following a first S200 speed signal. The invention further provides S200 and S100 mode validation according to current implementations.

More particularly, the speed code algorithm samples signals to detect speed codes signals which are transmitted in the data prefix portion 2 of the data transmission format 1 as described above in conjunction with FIG. 1. In a preferred embodiment, signals are sampled at 20 ns intervals.

The present invention does not have RX_DATA_PREFIX as a prerequisite for speed signal detection. Instead it relies on clearing speed signal registers at approximate times (e.g., at end of packets, chip resets, end of self-id speed signal trap operations). According to this arrangement, speed signaling is available to the state machine logic earlier thereby reducing PHY propagation delay.

The speed code algorithm ascertains or otherwise detects a first speed code signal of either S200 or S400. In a first case, a first S200 speed code signal is detected as the first speed code signal. The algorithm determines whether the next sampled signal is an S400 speed code signal. If so, the algorithm validates the S400 mode immediately based on the consecutive S200 and S400 signals. If not, the algorithm determines if the sampled signal is a second S200 speed code signal. If so, the algorithm validates S200 mode based on the two consecutive S200 signals. Otherwise, the algorithm does not validate either S200 or S400 mode based on the sampled signals detected.

In a second case, a first S400 speed code signal is detected as the first speed code signal, rather than an S200 speed code. The algorithm validates the S400 mode immediately based on the detection of the S400 signal since there is no other mechanism for producing a common mode excursion ($V_{cm}$ level) in the S400 range, as noted above.

Viewed from one vantage point, the method of the present invention comprises detecting a first S200 speed signal, detecting a first S400 speed signal immediately after detecting the first S200 speed signal; and validating S400 speed mode immediately after detecting the first S400 speed signal.

Viewed from another vantage point, the method of the present invention comprises detecting a first S400 speed signal as the first speed code signal; and validating S400 speed mode immediately after detecting the first S400 speed signal.

BRIEF DESCRIPTION OF THE DRAWINGS

The present invention will be more fully understood by reference to the following drawings, which are for illustrative purposes only.

DETAILED DESCRIPTION OF THE PREFERRED EMBODIMENTS

Persons of ordinary skill in the art will realize that the following description of the present invention is illustrative only and not in any way limiting. Other embodiments of the invention will readily suggest themselves to such skilled persons having the benefit of this disclosure.

Figure 5:
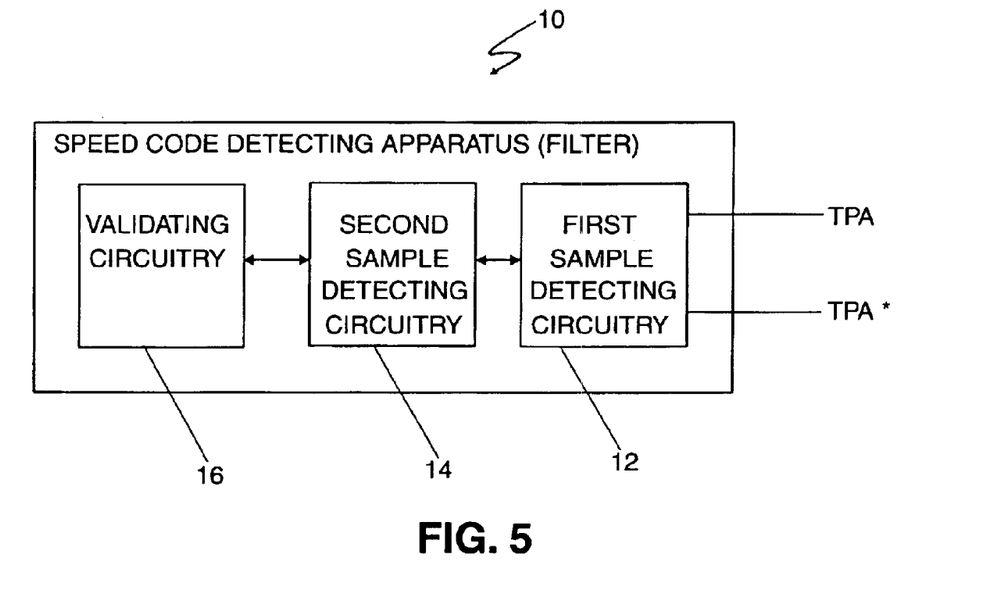
FIG. 5 is a block diagram showing generally the speed signal detecting apparatus of the present invention.
Figure 6:
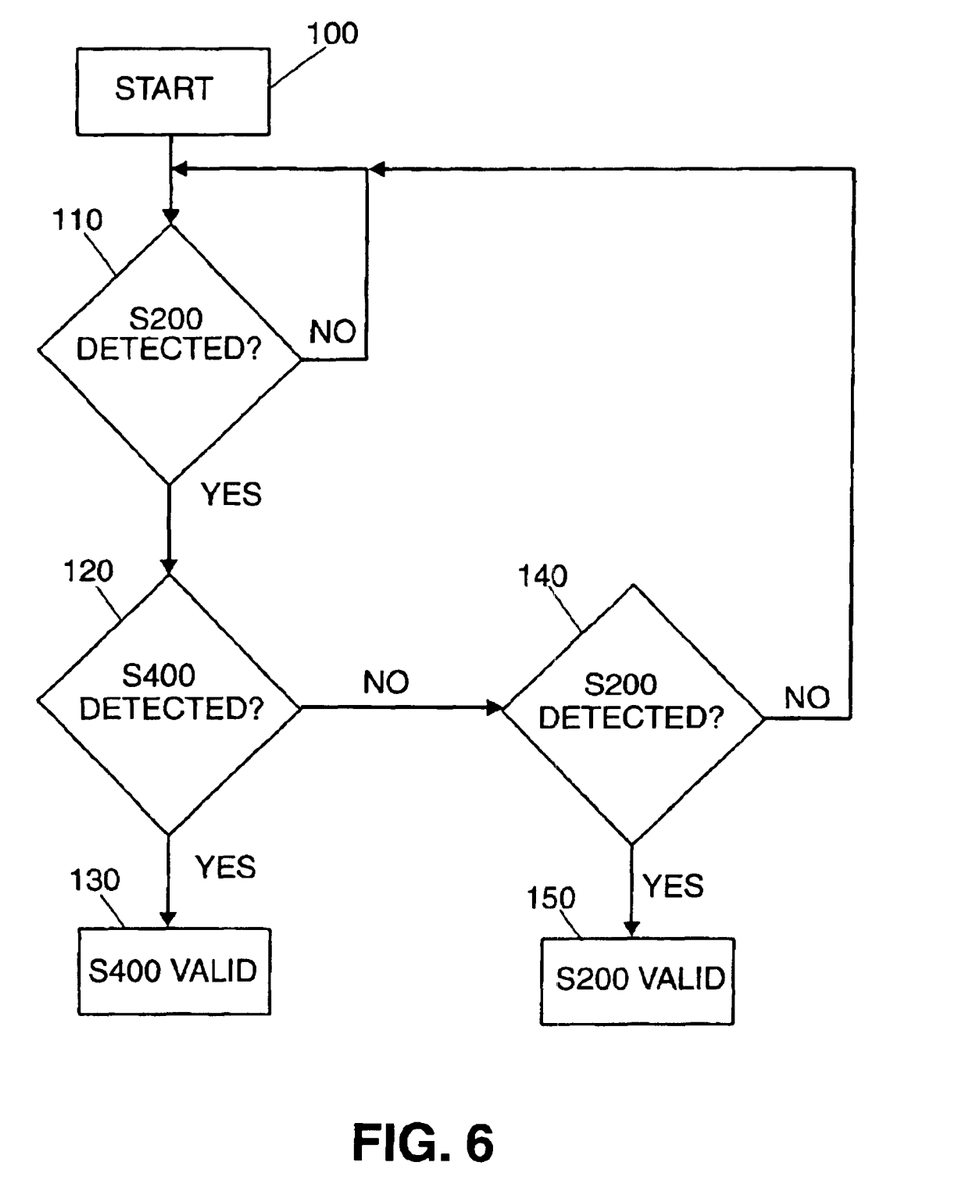
FIG. 6 shows generally a flow chart of the accelerated speed signal detection algorithm of the present invention according to a first case.
Figure 7:
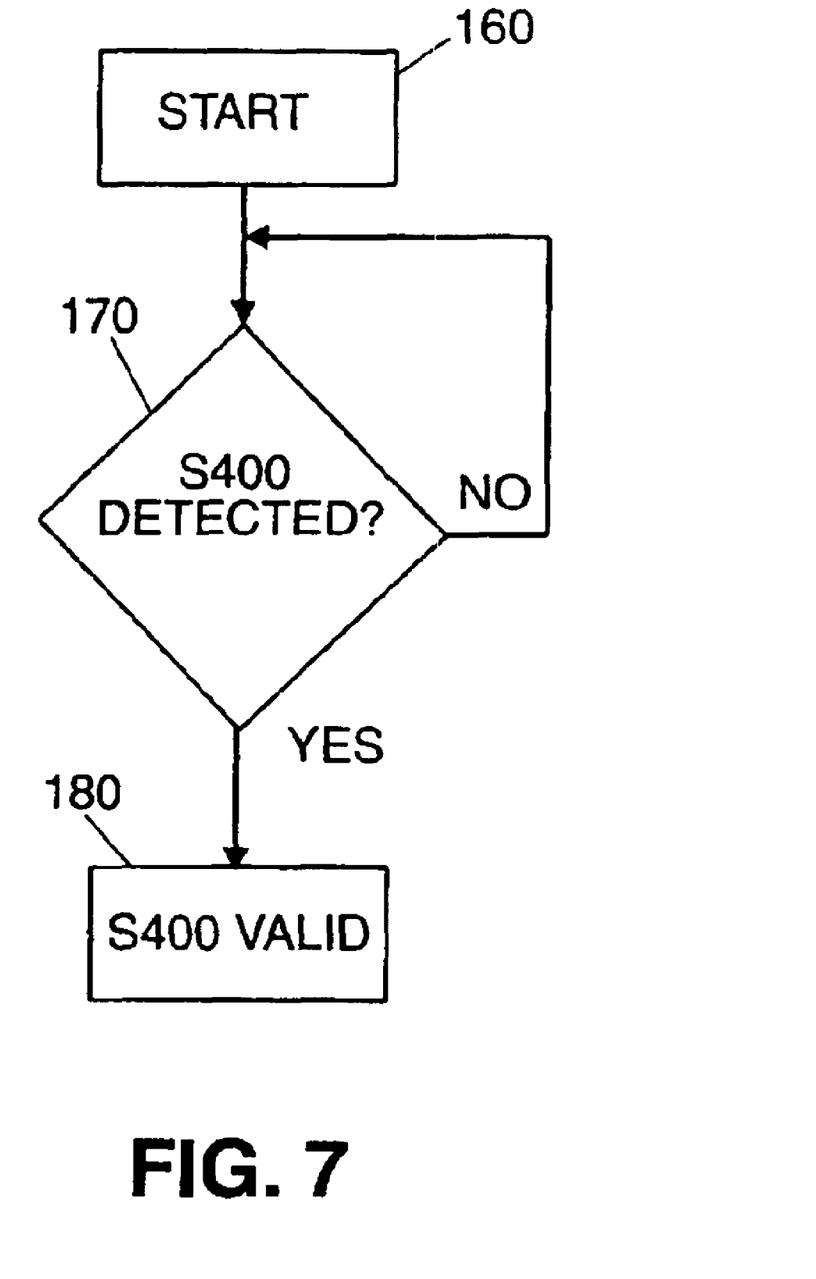
FIG. 7 shows generally a flow chart of the accelerated speed signal detection algorithm of the present invention according to a second case

Referring more specifically to the drawings, for illustrative purposes the present invention is embodied in the apparatus shown FIG. 5 and the method outlined in FIG. 6 and FIG. 7. It will be appreciated that the apparatus may vary as to configuration and as to details of the parts, and that the method may vary as to details and the order of the acts, without departing from the basic concepts as disclosed herein. The invention is disclosed generally in terms of a method and apparatus for use with IEEE standard 1394-1995 serial bus devices, although numerous other uses for the invention will suggest themselves to persons of ordinary skill in the art.

Referring now to FIG. 5, as well as FIG. 1 through FIG. 2*b*, there is generally shown a block diagram of a speed signal detecting apparatus (filter) 10 according to the present invention. Filter 10 includes first sample detecting circuitry 12, second sample detecting circuitry 14, and validating circuitry 16. Sampling circuitry 12, 14 sample signals from common mode lines TPA and TPA* at a predefined interval, and in particular, in the preferred embodiment at 20 ns intervals (the speed signal is driven on TPB drivers and are sampled by the TPA receivers). As noted above, circuitry 12, 14, 16 generally comprise state machine logic devices and operates in the PHY of a serial bus node device. In the present example, the serial bus node device is structured and configured according the IEEE Standard 1394-1995.

Filter 10 is further structured such that RX_DATA_PREFIX is not a prerequisite for speed signal detection. Instead, filter 10 relies on clearing speed signal registers at appropriate times (e.g., at end of packets, chip resets, end of self-id speed signal trap operations).

First sample detecting circuitry 12 carries out the operation of sampling the signals from TPA/TPA* to detect speed code signals which are communicated in the data prefix portion 2 of the transmission format 1 as described above in conjunction with FIG. 1. More particularly, circuitry 12 is configured to detect S200 and/or S400 speed signals. Circuit 12 continually monitors signals until an S200 or S400 speed signal is detected.

If the first speed signal is detected as S400, then validating circuitry 16 validates S400 mode immediately. However, if the first speed signal is detected as S200, second sample detecting circuitry 14 carries out the operation of sampling the next immediate signal from TPA/TPA* to detect if a second speed signals is observed. If circuit 14 detects an S400 speed signal in the second sampled signal, then validating circuitry 16 validates S400 mode. Circuit 14 also validates S200 mode where two consecutive S200 speed signals are detected (the first S200 signal detected by circuit 12, and the second detected by circuit 14). It noted that filter 10 is thus structured and configured to validate S400 mode after the detection of an S400 signal that immediately follows an S200 speed signal. Additionally, filter 10 is structured and configured to validate S400 mode after the detection of a first S400 speed signal, where the first S400 speed signal is the first sampled speed signal. That is, there may be a situation where the first sampled speed signal as detected by circuit 12 is detected as S400. In this case, the detection of an S400 speed signal is not preceded by a detection of an S200 signal.

As is known in the art, once a speed mode (S100, S200 or S400) is validated, the PHY configures its receiver circuitry to receive data in data packet 3 according to data rate of the speed mode indicated.

The method and operation of the invention will be more fully understood by reference to the flow charts of FIG. 6 and FIG. 7, as well as FIG. 1 through FIG. 2*b*, and FIG. 5. FIG. 6 illustrates generally the actions associated with detecting speed code signals according to the present invention in a first case scenario. FIG. 7 illustrates generally the actions associated with detecting speed code signals according to the present invention in a second case scenario. The order of operation as shown in FIG. 6 and FIG. 7 and described below is only exemplary, and should not be considered limiting.

It is noted that FIG. 6 as described herein depicts the case where the first sampled speed signal is detected as an S200 signal, white FIG. 7 as described further below depicts the case where the first sampled speed signal is detected as an S400 signal. While the algorithm is depicted herein as two separate flow charts for clarity, the speed detection algorithm may also be depicted as a single flow chart as is known in the art.

Referring now to FIG. 6, at box 100, filter 10 begins speed signal detection. In particular, circuit 12 monitors lines TPA/TPA* to detect S200 and S400 signals as described above. Diamond 10 is then carried out.

At diamond 110, circuit 12 determines whether an S200 speed code signal has been detected. As described above, it is common to first detect an S200 speed code signal before detecting an S400 speed code signal due to the shape and slope of an S400 speed code signal. If an S200 speed code signal is detected, diamond 120 is then carried out. Otherwise, diamond 110 is repeated to monitor the next sampled signal for a speed code signal.

At diamond 120, circuit 14 samples the next immediate signal to determine whether an S400 speed codes signal has been detected. If an S400 speed code signal is detected, box 130 is carried out to validate the S400 mode. Otherwise diamond 140 is carried out to determine if S200 mode is detected.

At box 130, the filter 10 has detected an S400 speed code signal immediately following an S200 speed code signal. According to the present algorithm, this is deemed to be a valid S400 mode. Thus circuit 16 validates the S400 mode based on the consecutive S400 speed code signal and S200 speed code signal. The present algorithm does not sample the next signal to ascertain whether another S400 speed code signal follows the presently determined S400 speed code signal, thereby avoiding the bottleneck associated with the prior art algorithm.

At diamond 140, circuit 14 determines whether the second sampled circuit is a S200 speed code signal. If so, box 150 is carried out to validate S200 mode. Otherwise, speed mode has not been determined, and diamond 110 is repeated to monitor the next sampled signal for a speed code signal.

At box 150, two consecutive S200 speed code signals have been detected, and circuit 16 validates S200 mode.

Referring now to FIG. 7, there is generally shown the case where the first sampled speed signal is detected as an S400 signal.

At box 160, filter 10 begins speed signal detection. Box 160 is the same event as box 100 as described above in conjunction with FIG. 6. Thus, circuit 12 monitors lines TPA/TPA* to detect S200 and S400 signals as described above. Diamond 170 is then carried out.

At box 170, circuit 12 determines whether a first S400 speed code signal has been detected as the first sampled speed code signal. As described above, there may be cases where circuit 12 detects the first sampled speed code signal as an S400 speed code signal, rather than an S200 speed code signal. If an S400 speed code signal is detected, box 180 is carried out to validate the S400 mode. Otherwise, diamond 170 is repeated to monitor the next sampled signal for a speed code signal.

At box 180, the filter 10 has detected an S400 speed code signal. According to the present algorithm, this is deemed to be a valid S400 mode since there is no other mechanism to produce a common mode excursion is the S400 range. Thus circuit 16 validates the S400 mode based on the single S400 speed code signal.

Accordingly, it will be seen that this invention provides a method and apparatus which accelerates speed code signal detection for serial bus devices. Although the description above contains many specificities, these should not be construed as limiting the scope of the invention but as merely providing an illustration of the presently preferred embodiment of the invention. Thus the scope of this invention should be determined by the appended claims and their legal equivalents.

What is claimed is:

1. A method of administering a serial bus, the method comprising the acts of:

providing a speed signal register;

detecting a first speed signal received by the speed signal register, the first speed signal indicating a first speed code;

detecting a second speed signal received by the speed signal register, the second speed signal indicating a second speed code, the second speed code being different from the first speed code; and validating a speed mode based on the order in which the speed signals were received.

2. The method of claim 1, wherein the first speed signal is a S200 signal and the second speed signal is an S400 signal, and the speed mode validated is an S400 speed mode.

3. The method of claim 1, further comprising clearing the speed signal register after transmission of a plurality of packets has concluded.

4. The method of claim 1, further comprising clearing the speed signal register after a chip reset has occurred.

5. The method of claim 1, further comprising clearing the speed signal register after a self-ID speed signal trap has occurred.

6. A computer-readable medium containing instructions, which, when executed by a computer, administer a serial bus by:

communicating with a speed signal register;

detecting a first speed signal received by the speed signal register, the first speed signal indicating a first speed code;

detecting a second speed signal received by the speed signal register, the second speed signal indicating a second speed code, the second speed code being different from the first speed code; and validating a speed mode based on the order in which the speed signals were received.

* * * * *